US009098999B2

(12) United States Patent
Snow et al.

(10) Patent No.: US 9,098,999 B2
(45) Date of Patent: Aug. 4, 2015

(54) SYSTEMS AND METHODS FOR ASSURING THE ACCURACY OF A SYNTHETIC RUNWAY PRESENTATION

(71) Applicant: The Boeing Company, Chicago, IL (US)

(72) Inventors: Paul T. Snow, Seattle, WA (US); Andrew R. Hooks, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/482,237

(22) Filed: Sep. 10, 2014

(65) Prior Publication Data

US 2015/0081143 A1 Mar. 19, 2015

Related U.S. Application Data

(60) Provisional application No. 61/877,667, filed on Sep. 13, 2013.

(51) Int. Cl.

*G01C 23/00* (2006.01)
*G08G 5/02* (2006.01)
*G08G 5/00* (2006.01)

(52) U.S. Cl.

CPC .............. *G08G 5/025* (2013.01); *G08G 5/0021* (2013.01)

(58) Field of Classification Search

None
See application file for complete search history.

(56) References Cited

U.S. PATENT DOCUMENTS 3,644,722 A 2/1972 Hobbs et al.
4,316,252 A 2/1982 Cooper
5,014,053 A 5/1991 Nguyen
5,343,395 A * 8/1994 Watts .............................. 701/16
5,361,212 A 11/1994 Class et al.
5,600,329 A 2/1997 Brenner
5,745,054 A * 4/1998 Wilkens ........................ 340/972
6,157,876 A * 12/2000 Tarleton et al. ................. 701/16
6,178,363 B1 * 1/2001 McIntyre et al. ............... 701/16
6,239,745 B1 5/2001 Stratton
6,342,853 B1 1/2002 Kalafus et al.
6,711,479 B1 3/2004 Staggs
7,089,092 B1 * 8/2006 Wood et al. ..................... 701/14
7,283,064 B2 * 10/2007 He ................................ 340/973
7,337,063 B1 * 2/2008 Oberg et al. .................. 701/469
7,428,450 B1 * 9/2008 Oberg ............................... 701/4
7,546,183 B1 * 6/2009 Marcum ......................... 701/17
7,619,556 B1 * 11/2009 McCusker ...................... 342/33
7,787,998 B2 8/2010 Foucart et al.
8,112,188 B2 * 2/2012 Rouquette et al. .............. 701/16

(Continued)

*Primary Examiner* — Jonathan M Dager
(74) *Attorney, Agent, or Firm* — Ostrager Chong Flaherty & Broitman P.C.

(57) ABSTRACT

Automated systems and methods that utilize high-accuracy landing system data to correct the position of a synthetic runway presentation on a pilot display. This is achieved by first computing the "synthetic" lateral and vertical rectilinear deviations of the airplane from an ideal beam using the airplane's GPS position and barometric altitude, the runway location and orientation contained in an airborne database, and approach angle information. This synthetic deviation data is then compared to rectilinear deviation data computed by the computer system as received from a ground installation. The computer system is programmed to determine the differences between the ground-based and GPS-based rectilinear deviation data and then compute a corrected position vector using those differences. The position of the synthetic runway symbology on the pilot display is adjusted as a function of the corrected position vector.

20 Claims, 7 Drawing Sheets

(56) References Cited

U.S. PATENT DOCUMENTS

| | | | | |
|---|---|---|---|---|
| 8,116,923 | B2 * | 2/2012 | Ishihara et al. | 701/17 |
| 8,126,600 | B2 * | 2/2012 | Conner et al. | 701/16 |
| 8,428,795 | B2 * | 4/2013 | Caule | 701/16 |
| 8,457,882 | B2 * | 6/2013 | Pyne et al. | 701/418 |
| 8,781,654 | B2 * | 7/2014 | Giovannini et al. | 701/18 |
| 8,797,191 | B2 * | 8/2014 | Samuthirapandian et al. | 340/972 |
| 8,914,166 | B2 * | 12/2014 | He | 701/16 |
| 8,928,527 | B2 * | 1/2015 | He et al. | 342/357.32 |
| 2002/0040263 | A1 * | 4/2002 | Johnson et al. | 701/17 |
| 2002/0099528 | A1 * | 7/2002 | Hett | 703/13 |
| 2003/0171856 | A1 * | 9/2003 | Wilf | 701/16 |
| 2004/0044446 | A1 * | 3/2004 | Staggs | 701/16 |
| 2007/0032924 | A1 | 2/2007 | Foucart et al. | |
| 2007/0088491 | A1 * | 4/2007 | He | 701/120 |
| 2007/0106433 | A1 * | 5/2007 | He | 701/16 |
| 2007/0188350 | A1 * | 8/2007 | He et al. | 340/979 |
| 2008/0103644 | A1 | 5/2008 | Oberg et al. | |
| 2008/0169941 | A1 * | 7/2008 | He | 340/971 |
| 2008/0297397 | A1 | 12/2008 | Oberg | |
| 2010/0026525 | A1 * | 2/2010 | Feyereisen et al. | 340/972 |
| 2010/0097241 | A1 * | 4/2010 | Suddreth | 340/972 |
| 2010/0250030 | A1 * | 9/2010 | Nichols et al. | 701/7 |
| 2011/0087388 | A1 * | 4/2011 | Watson et al. | 701/16 |
| 2011/0090096 | A1 * | 4/2011 | Goh et al. | 340/972 |
| 2011/0106345 | A1 * | 5/2011 | Takacs et al. | 701/17 |
| 2011/0130897 | A1 * | 6/2011 | Gladysz et al. | 701/15 |
| 2011/0142281 | A1 * | 6/2011 | He | 382/103 |
| 2011/0304479 | A1 * | 12/2011 | Chen et al. | 340/951 |
| 2012/0265376 | A1 * | 10/2012 | Fleiger-Holmes et al. | 701/16 |
| 2013/0041529 | A1 * | 2/2013 | He et al. | 701/17 |
| 2013/0046462 | A1 * | 2/2013 | Feyereisen et al. | 701/457 |
| 2014/0114506 | A1 * | 4/2014 | Puyou et al. | 701/18 |
| 2014/0249703 | A1 * | 9/2014 | He | 701/17 |
| 2014/0277857 | A1 * | 9/2014 | Bourret et al. | 701/17 |
| 2014/0354456 | A1 * | 12/2014 | Gannon et al. | 340/972 |

* cited by examiner

SYSTEMS AND METHODS FOR ASSURING THE ACCURACY OF A SYNTHETIC RUNWAY PRESENTATION

RELATED PATENT APPLICATION

This application claims the benefit, under Title 35, United States Code, §119(e), of U.S. Provisional Application No. 61/877,667 filed on Sep. 13, 2013.

BACKGROUND

The invention generally relates to electronic displays and more specifically to the positioning of synthetic runway symbology on an aircraft display.

Under instrument flight conditions (i.e., poor visibility), pilots rely on instruments to navigate an aircraft, particularly during approach and landing on a runway. Current systems use instrument landing systems (ILS), microwave landing systems (MLS), or satellite landing systems, such as the Ground Based Augmentation System locating system (GLS), to safely guide aircraft during approach to a runway.

Some current display systems are designed to make landing displays more intuitive for pilots. One approach has been to display a runway symbol (i.e., a synthetic runway) which represents the position and orientation of a target runway relative to a pilot's point of view. The advantages of such a display system include reductions in pilot workload, pilot fatigue, and pilot error. Reduced workload enables a pilot to perform better during approach and landing. However, it is disadvantageous if the synthetic runway display is not properly aligned with the target runway and guidance cue during approach.

Synthetic runway vision systems rely on GPS position and airport/runway database information to render a "first person" view of topography in front of an airplane. The accuracy of these synthetic runway vision systems is limited by the accuracy of the GPS position estimate and the accuracy of the runway database information, which in turn limits the operational usefulness of the function.

Highly accurate, differentially corrected GPS data is available in certain locations via Satellite-Based Augmentation Systems (SBAS), but even then, runway database errors can result in erroneous display of a synthetic runway.

It would be beneficial if a vision (i.e., display) system were provided having the capability to overcome inaccuracies in the GPS position estimates and in the runway database.

SUMMARY

The subject matter disclosed in detail below is a system comprising a computer that is programmed to perform algorithms for assuring the accuracy of a synthetic runway presentation. The computer system utilizes high-accuracy xLS (the term "xLS" as used herein refers to ILS and GLS in the alternative) data to correct the position of a synthetic runway presentation on a pilot display. This is achieved by first computing the "synthetic" lateral and vertical rectilinear deviations of the airplane from an ideal xLS beam using the airplane's GPS position and barometric altitude, the runway location and orientation contained in an airborne database, and approach angle information. This synthetic deviation data is then compared to rectilinear deviation data computed by the computer system as received from the xLS ground installation. The computer system is further programmed to determine the differences (also referred to herein as "correction terms") between the xLS-based and GPS-based rectilinear deviation data. The computer system further comprises a filtering algorithm that ensures the position corrections are adjusted in a way so as not to be distracting to the pilot. These correction terms are used to compute a corrected position vector. The position of the synthetic runway symbology on the pilot display is adjusted as a function of the corrected position vector. The computer system is further programmed to execute operations for issuing an alert and inhibiting the synthetic runway presentation on the cockpit display in response to a determination that the discrepancy between the true and virtual positions of the airplane relative to the runway is equal to or greater than a specified threshold. The alert algorithm determines the value of a display accuracy metric as part of a process to ensure that the synthetic runway has converged to a position on the cockpit display consistent with the "ground truth" (i.e., more accurate) xLS data.

The computer system described herein largely overcomes the inaccuracies of the GPS position estimate and the runway database information by leveraging rectilinear deviation data provided by ILS or GLS infrastructure at the destination runway to correct the errors in the synthetic runway presentation to the pilot. One benefit of this system is that it will work anywhere in the world that ILS or GLS infrastructure is available. In addition, the system disclosed herein provides a more accurate runway presentation to the flight crew, which promotes more stable approaches to runways, improves runway safety and has the potential to enable landing credit (i.e. lower minimums) in the future.

One aspect of the subject matter disclosed in detail below is a method for positioning a synthetic runway presentation on a display screen of a display unit as an airplane approaches a runway, comprising the following steps performed by an onboard computer system: (a) computing first rectilinear deviation data representing successive estimated rectilinear deviations of the airplane from the desired flight path during the approach, the first rectilinear deviation data being computed based at least in part on airplane sensed angular deviation data from ground-based reference beams and airplane-to-runway distance data; (b) computing second rectilinear deviation data representing successive estimated rectilinear deviations of the airplane from the desired flight path during the approach, the second rectilinear deviation data being computed based at least in part on airplane latitude, longitude and altitude data and runway data; (c) computing a corrected position vector based at least in part on a difference between the first and second rectilinear deviation data; and (d) controlling a display unit to display a synthetic runway presentation having a position on the display screen that is a function of the corrected position vector. Step (d) comprises moving the synthetic runway presentation from an uncorrected position on the display screen to the corrected position on the display screen. In accordance with some embodiments, step (c) comprises filtering differences between the first and second rectilinear deviation data to avoid perceptible motion of the synthetic runway presentation which is not associated with airplane motion. In these embodiments, the method may further comprise: computing a display accuracy metric based on differences between unfiltered and filtered differences between the first and second rectilinear deviation data; and inhibiting display of the synthetic runway presentation or issuing an alert signal to the pilot if the display accuracy metric indicates a difference greater than a threshold with sufficient persistence when the airplane is beyond a predetermined location on the approach.

Another aspect of the subject matter disclosed in detail below is a method for positioning a synthetic runway presentation on a display screen of a display unit as an airplane approaches a runway, comprising the following steps performed by an onboard computer system: (a) obtaining runway and path definition data from an airborne database; (b) acquiring sensed angular deviation data from ground-based reference beams and latitude, longitude and altitude data for the aircraft during its approach, the angular deviation data representing successive angular deviations of the airplane from a desired flight path; (c) computing distance data representing successive distances of the airplane from the runway during the approach based on the latitude, longitude and altitude data and the runway data; (d) computing first rectilinear deviation data representing successive estimated rectilinear deviations of the airplane from the desired flight path during the approach, the first rectilinear deviation data being computed based at least in part on the angular deviation data and the distance data; (e) computing second rectilinear deviation data representing successive estimated rectilinear deviations of the airplane from the desired flight path during the approach, the second rectilinear deviation data being computed based at least in part on the latitude, longitude and altitude data representing a corrected position vector and the runway data; (f) computing a corrected position vector based at least in part on a difference between the first and second rectilinear deviation data; and (g) controlling a display unit to display a synthetic runway presentation having a position on a display screen that is a function of the corrected position vector.

A further aspect of the subject matter disclosed herein is a device for displaying a synthetic runway as an airplane approaches a runway, comprising a display screen and a computer system programmed to perform the following operations: (a) computing first rectilinear deviation data representing successive estimated rectilinear deviations of the airplane from the desired flight path during the approach, the first rectilinear deviation data being computed based at least in part on airplane sensed angular deviation data from ground-based reference beams and airplane-to-runway distance data; (b) computing second rectilinear deviation data representing successive estimated rectilinear deviations of the airplane from the desired flight path during the approach, the second rectilinear deviation data being computed based at least in part on airplane latitude, longitude and altitude data and runway data; (c) computing a corrected position vector based at least in part on a difference between the first and second rectilinear deviation data; and (d) controlling the display screen to display a synthetic runway presentation having a position that is a function of the corrected position vector.

Yet another aspect is an onboard system for positioning a synthetic runway presentation on a display screen of a display unit as an airplane approaches a runway, the onboard system comprising: a display unit comprising a display screen; a localizer receiver that provides lateral difference in depth of modulation data; a GPS receiver for receiving GPS signals; a database containing runway data for a runway and path definition data; and a computer system programmed to perform the following operations: (a) determining a latitude and a longitude of the airplane from the GPS signals; (b) determining an altitude of the airplane; (c) computing a distance separating the airplane and a point on the runway based at least in part on at least the latitude, the longitude, the altitude, the runway data, and the path definition data; (d) computing a lateral angular deviation of the airplane based at least in part on the lateral difference in depth of modulation data; (e) computing a lateral rectilinear deviation of the airplane based at least in part on the distance and the lateral angular deviation; (f) computing a synthetic lateral rectilinear deviation of the airplane based at least in part on the distance and the path definition data; (g) computing a first difference between the lateral rectilinear deviation and the synthetic lateral rectilinear deviation; (h) computing a corrected lateral position based at least in part on the first difference and a lateral position characterized by the latitude and the longitude of the airplane; and (i) controlling the display unit to display on the display screen a synthetic runway presentation having a lateral position that is a function of the corrected lateral position. The system may further comprise a lag filter that filters the difference between the lateral rectilinear deviation and the synthetic lateral rectilinear deviation. Also the system may further comprise a glideslope receiver that provides vertical difference in depth of modulation data, wherein the computer system is further programmed to perform the following operations: (j) computing a vertical angular deviation of the airplane based at least in part on the vertical difference in depth of modulation data; (k) computing a vertical rectilinear deviation of the airplane based at least in part on the distance and the vertical angular deviation; (l) computing a synthetic vertical rectilinear deviation of the airplane based at least in part on the distance and the path definition data; (m) computing a second difference between the vertical rectilinear deviation and the synthetic vertical rectilinear deviation; and (n) computing a corrected vertical position based at least in part on the second difference and a vertical position characterized by the latitude and the longitude of the airplane, wherein operation (i) further comprises controlling the display unit to display on the display screen a synthetic runway presentation having a vertical position that is a function of the corrected vertical position.

Other aspects of systems and methods for assuring the accuracy of a synthetic runway presentation are disclosed below.

BRIEF DESCRIPTION OF THE DRAWINGS

Reference will hereinafter be made to the drawings in which similar elements in different drawings bear the same reference numerals.

DETAILED DESCRIPTION

Figure 1:
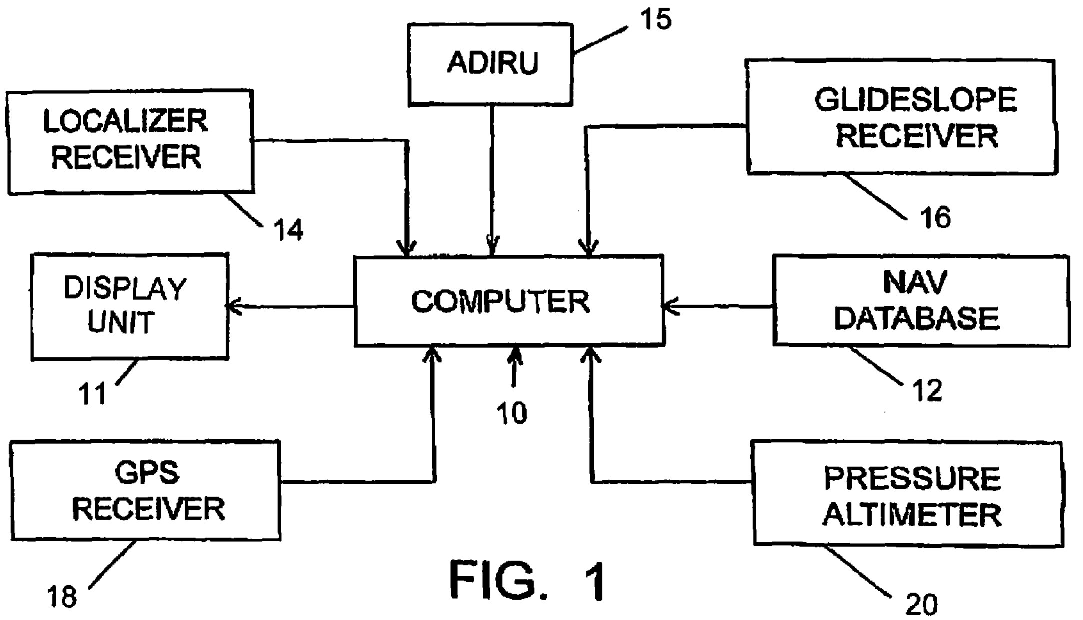
FIG. 1 is a block diagram showing components of a system for correcting and/or inhibiting the display of a synthetic runway on a cockpit display unit (e.g., a head-down display or a head-up display) in accordance with one embodiment.

Systems and methods for correcting and/or inhibiting the display of a synthetic runway on a cockpit display will now be described with reference to specific embodiments that employ an instrument landing system (ILS) to provide the precise location of an aircraft relative to a runway. The display provides a synthetic image of the runway that conforms to a true view of the actual runway as viewed from the cockpit during an approach. The synthetic runway image may include other symbols, such as a flight path indicator, an extended runway centerline, and touch down zone symbols. The synthetic runway display provides a means for improving the situational awareness of the flight crew and facilitating landing in low-visibility conditions.

An instrument landing system (ILS) is a ground-based instrument approach system that provides precision guidance to an aircraft approaching and landing on a runway, using a combination of radio signals and, in many cases, high-intensity lighting arrays to enable a safe landing during instrument meteorological conditions, such as low ceilings or reduced visibility due to fog, rain, or snow. Instrument approach procedure charts (or approach plates) are published for each ILS approach, providing pilots with the needed information to fly an ILS approach during instrument flight rules operations, including the radio frequencies used by the ILS components and the minimum visibility requirements prescribed for the specific approach.

An ILS includes ground-based transmitters, located at runways, and airborne receivers. The ILS transmitters transmit signals, received by the receivers on the aircraft, which are utilized to align an aircraft's approach to a runway. Typically, an ILS consists of two portions, a localizer portion and a glide slope portion. The localizer portion is utilized to provide lateral guidance and includes a localizer transmitter located at the far end of the runway. The glide slope portion provides vertical guidance to a runway and includes a glide slope transmitter located at the approach end of the runway. Aircraft guidance is provided by the ILS receivers in the aircraft by performing a modulation depth comparison.

More specifically, a localizer (LOC) antenna array is normally located beyond the departure end of the runway and generally consists of several pairs of directional antennas. Two signals are transmitted at a carrier frequency. One is modulated at 90 Hz; the other at 150 Hz. These modulated signals are transmitted from separate but co-located antennas. Each antenna transmits a narrow beam, one slightly to the left of the runway centerline, the other to the right.

A glide slope (GS) antenna array is sited to one side of the runway touchdown zone. The GS signal is transmitted on a carrier frequency using a technique similar to that of the localizer. The centerline of the glide slope signal is arranged to define a glide slope of approximately 3° above horizontal (ground level). The beam is 1.4° deep; 0.7° below the glideslope centerline and 0.7° above the glideslope centerline.

A localizer receiver on the aircraft measures the difference in the depth of modulation (DDM) of the 90 and 150 Hz modulated signals. For the localizer, the depth of modulation for each of the modulating frequencies is 20 percent. The difference between the two signals varies depending on the deviation of the approaching aircraft from the centerline. If there is a predominance of either modulated signal, the aircraft is off the centerline. In the cockpit, the needle on a horizontal situation or course deviation indicator will show that the aircraft needs to fly left or right to correct the error to fly down the center of the runway. If the DDM is zero (i.e., null), the aircraft is on the centerline of the localizer coinciding with the physical runway centerline. A glideslope receiver on the aircraft measures the DDM of modulated signals in a similar manner.

In the alternative, a synthetic runway presentation can be corrected and/or inhibited using a Ground Based Augmentation Systems (GBAS), e.g., the FAA's Local Area Augmentation System (LAAS). U.S. Patent Application Publ. No. 2012/0265376 (the disclosure of which is incorporated by reference herein in its entirety) discloses some details concerning LAAS airborne equipment for computing horizontal and vertical deviation outputs in DDMs during landing. A GBAS supports augmentation of a global navigation satellite system (GNSS) through the use of terrestrial radio messages. Ground-based augmentation systems are commonly composed of one or more accurately surveyed ground stations, which take measurements concerning the GNSS, and one or more radio transmitters, which transmit the information directly to the end user. Generally, GBAS networks are considered localized, supporting receivers within 20 km, and transmitting in the very-high-frequency (VHF) and ultra-high-frequency (UHF) bands. The airplane function that uses GBAS is called a GBAS Landing System (GLS).

FIG. 1 is a block diagram showing components of a system for correcting and/or inhibiting the display of a synthetic runway on a display unit 11 (e.g., a head-down display or a head-up display) in accordance with one embodiment that uses the ILS. The system comprises a computer system 10 that receives data from a multiplicity of sources. The computer system 10 comprises at least one computer or processor (e.g., flight control computer), and may have multiple computers or processors that communicate through a network or bus. The received data includes the following: runway, localizer transmitter and glide slope transmitter positional data retrieved from a navigation database 12; difference in depth of modulation data received from a localizer receiver 14; difference in depth of modulation data received from a glideslope receiver 16; airplane positional data received from a GPS receiver 18; barometric altitude data received from a pressure altimeter 20; and air data and inertial reference data received from an air data inertial reference unit (ADIRU) 15. Optionally, instead of using the barometric altitude from the pressure altimeter 20, the altitude can be derived from GPS signals received by the GPS receiver 18.

Referring again to FIG. 1, the computer system 10 is programmed to execute operations for correcting the position of a synthetic runway on the cockpit display 11 as a function of the above-described inputs. More specifically, the magnitudes of the corrections along three coordinate axes are calculated in known manner based on the computed differences between synthetic and xLS-based rectilinear (i.e., cross track) deviations, namely, the computed difference between synthetic and xLS-based lateral rectilinear deviations and the computed difference between synthetic and xLS-based vertical rectilinear deviations. The correction terms are filtered and then the filtered correction terms are used to compute a corrected position vector. The position of the synthetic runway symbology on the pilot display is adjusted as a function of the corrected position vector. The computer system 10 is further programmed to execute operations for inhibiting the synthetic runway presentation on cockpit display 11 in response to a determination that the discrepancy between the true and virtual positions of the airplane relative to the runway is equal to or greater than a specified threshold. The threshold is chosen in order to assure that the synthetic runway presentation will be consistent with the primary guidance cue that is positioned on the display based on signals from the autopilot. In accordance with one embodiment, this threshold may be based on the size of a circular guidance cue such that the synthetic runway aim point (referred to herein as the Glide Path Intercept Point) will fall within the primary guidance cue when the airplane is stabilized on the approach path.

Figure 2:
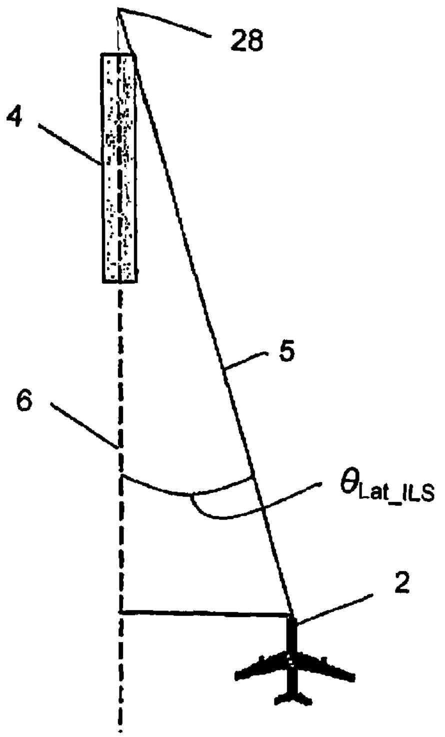
FIG. 2 is a diagram showing the lateral angular deviation from the runway centerline for an approaching airplane.

In accordance with one embodiment, the computer system 10 is also programmed with software for executing an algorithm that calculates the airplane's lateral angular deviation $\theta_{Lat\_ILS}$ using DDM data from the localizer receiver 14. FIG. 2 is a diagram showing an airplane 2 that is approaching a runway 4 along a path not in alignment with the runway centerline 6. The Azimuth Reference Point 28 corresponds to the point that serves as the reference for the localizer beam (i.e., the localizer transmitter location), which is typically 1000 ft beyond the far end of the runway. The lateral angular deviation $\theta_{Lat\_ILS}$ is the angle between the runway centerline 6 and a vector 5 from the airplane 2 to the Azimuth Reference Point 28.

Figure 3:
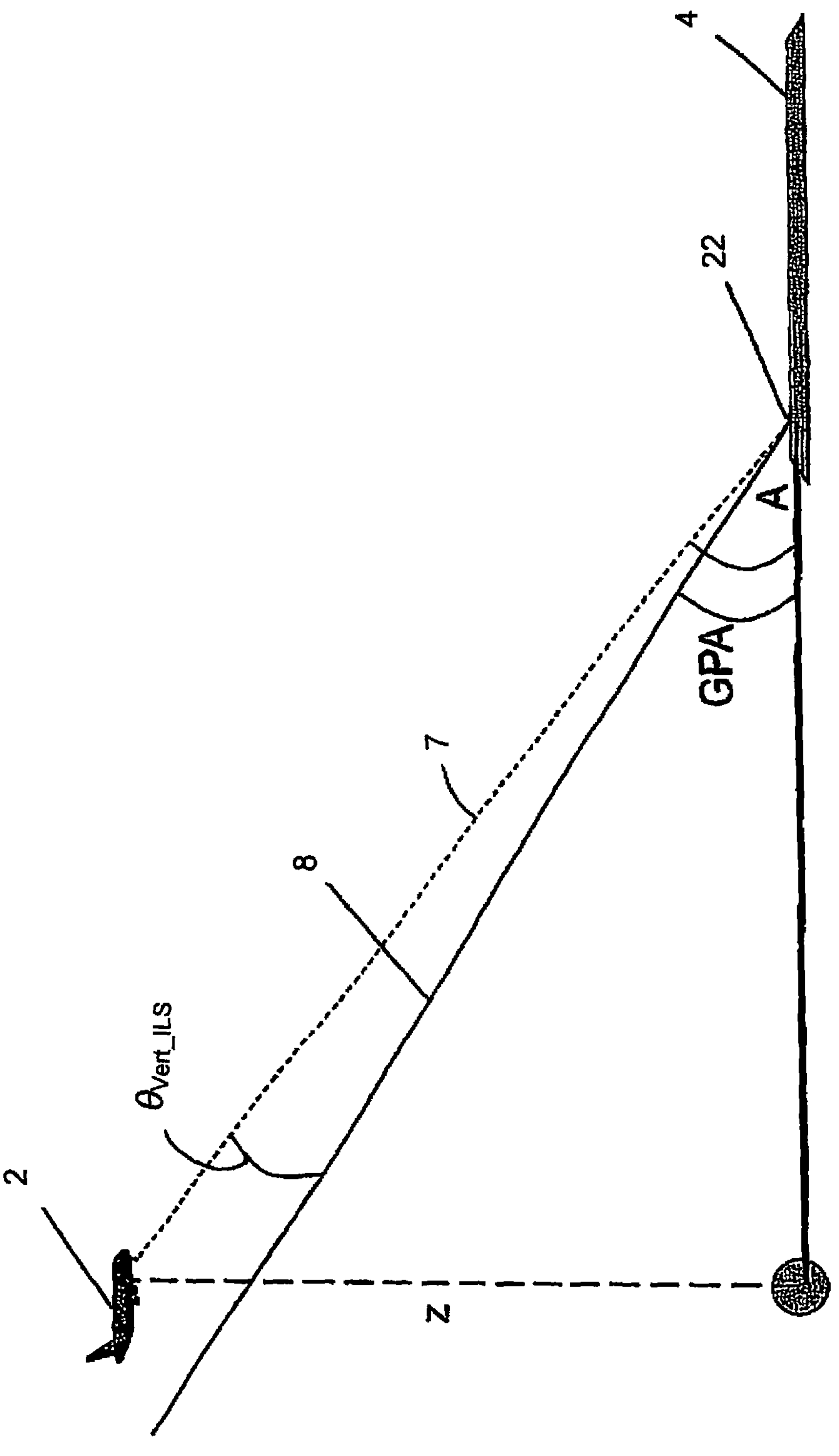
FIG. 3 is a diagram showing the vertical angular deviation from the glide slope for an approaching airplane.

The computer system 10 may be further programmed with software for executing an algorithm that calculates the airplane's vertical angular deviation $\theta_{Vert\_ILS}$ using DDM data from the glideslope receiver 16. FIG. 3 is a diagram showing the vertical angular deviation $\theta_{Vert\_ILS}$ from the Final Approach Segment 8 (FAS) for an approaching airplane 2. The Final Approach Segment 8 intersects the runway 4 at the Glide Path Intercept Point 22. The Glide Path Angle (GPA) is the angle between the local horizontal line and the Final Approach Segment 8. A vector 7 extends from the airplane 2 to the Glide Path Intercept Point 22. The angle A is the angle between vector 7 and the local horizontal line. The vertical angular deviation $\theta_{Vert\_ILS}$ is the difference between angle A and the Glide Path Angle.

In the alternative or in addition, the computer system 10 is programmed with software for executing an algorithm that calculates the lateral angular deviation $\theta_{Lat\_GLS}$ the airplane's ground track from the runway centerline using a GLS. Similarly, the computer system 10 can be programmed with software for executing an algorithm that calculates the airplane's vertical angular deviation $\theta_{Vert\_GLS}$ from the glide slope using the GLS.

The lateral and vertical angular deviations are computed relative to the Final Approach Segment 8, which is the segment of an instrument approach procedure in which the alignment and descent for landing are accomplished. In the case of a precision approach (e.g., ILS), the Final Approach Segment 8 begins at the final approach point. This is a point in space on the centerline of the localizer. Computation of angular deviations relative to the Final Approach Segment 8 can be done in a variety of ways. Proper computation of the Final Approach Segment 8 should be consistent with the relationships shown in FIG. 4.

Figure 4:
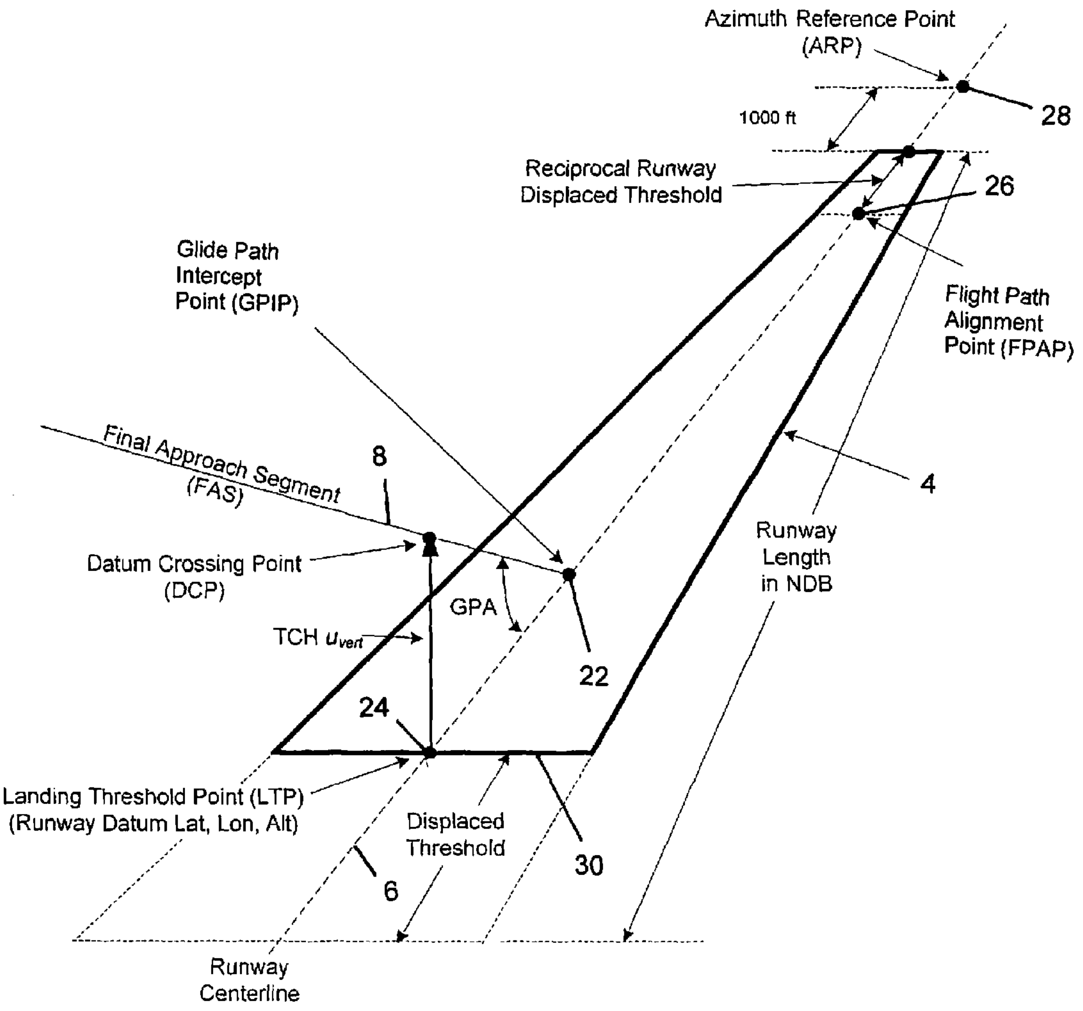
FIG. 4 is a diagram showing the relationships used in computation of a Final Approach Segment.

Referring to FIG. 4, the Final Approach Segment (FAS) 8 is defined uniquely by the Landing Threshold Point (LTP) 24, the Flight Path Alignment Point (FPAP) 26, the Glide Path Angle (GPA) and the Threshold Crossing Height (TCH), which are retrieved from the navigation database. The Final Approach Segment 8 defines a coordinate system fixed to the runway 4. The bold outline in FIG. 4 defines perspective runway edge lines on approach. On departure, the perspective runway edge lines include the displaced threshold. A displaced threshold is a runway threshold located at a point other than the physical beginning or end of the runway. The portion of the runway so displaced may be used for takeoff but not for landing. Landing aircraft may use the displaced area on the opposite end for roll out.

Still referring to FIG. 4, the Glide Path Intercept Point (GPIP) 22 is the point where the Final Approach Segment 8 intersects the locally level plane that includes the Landing Threshold Point 24. (Note that the Glide Path Intercept Point 22 may actually be above or below the surface of the runway 4 depending on the runway slant, curvature, etc.) The Glide Path Intercept Point 22 corresponds to the point on the runway 4 that serves as the reference for the glideslope beam (i.e., the glideslope antenna location), roughly 1000 ft from the runway threshold 30. The exact point is computed using the Glide Path Angle (GPA) and the Threshold Crossing Height (TCH) from approach data in the navigation database on the airplane. The vertical unit vector $u_{vert}$ may be defined to be the normal to an ellipsoidal planet Earth defined in the WGS84 ECEF Cartesian coordinate system at the Landing Threshold Point 24. Local level is defined as a plane perpendicular to $u_{vert}$ (i.e., tangent to the WGS84 ellipsoid at the Landing Threshold Point 24).

The computer system as described herein serves as an onboard monitor that ensures the accuracy of data (e.g., synthetic runway data) representing the calculated position of an airplane during final approach to a runway. This synthetic runway position assurance monitor is a software function that uses dissimilar sources of airplane position and runway data to ensure the accuracy of the respective data from those dissimilar sources. xLS data and GPS latitude/longitude and GPS or barometric altitude data are the dissimilar sources of airplane position data used by this function. Inertial reference data may be used for filtering scheme rate limiting. This synthetic runway position assurance monitoring function will determine the airplane's rectilinear deviations from the runway centerline and from the glide slope with onboard equipment and then compare those rectilinear deviations to the xLS-based rectilinear deviation information.

Figure 5:
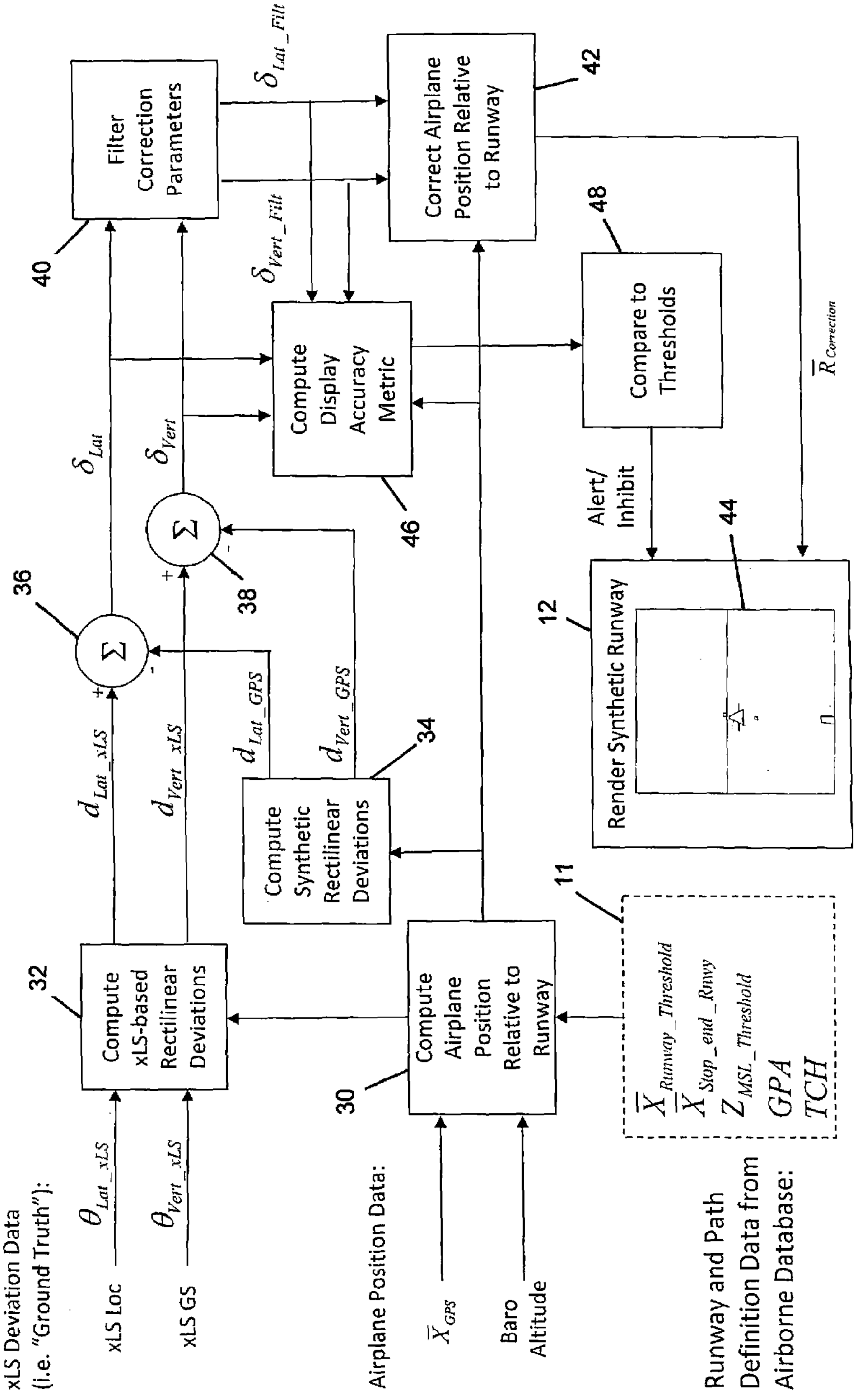
FIG. 5 is a flowchart showing software modules for executing an algorithm for correcting the position of a synthetic runway presentation on a display unit using xLS-based angular deviations, GPS position data, and baro-altitude data.

FIG. 5 is a flowchart showing software modules for correcting the position of the synthetic runway presentation 44 on a cockpit display 11 as a function of selected parameters, including at least the following: (1) the xLS (i.e., ILS or GLS) angular deviation data (i.e., lateral angular deviation $\theta_{Lat\_xLS}$ and vertical angular deviation $\theta_{Vert\_xLS}$); (2) airplane position data (e.g., the GPS-derived latitude/longitude of the airplane $\overline{X}_{GPS}$ and the barometric (or GPS) altitude; and (3) runway and path definition data from the navigation database 12. The computer system is further programmed with software modules for inhibiting the synthetic runway presentation on cockpit display 11 in response to a determination that either the discrepancy between the true and virtual lateral positions of the airplane relative to the runway or the discrepancy between the true and virtual vertical positions of the airplane relative to the runway is equal to or greater than a specified threshold.

Figure 5A:
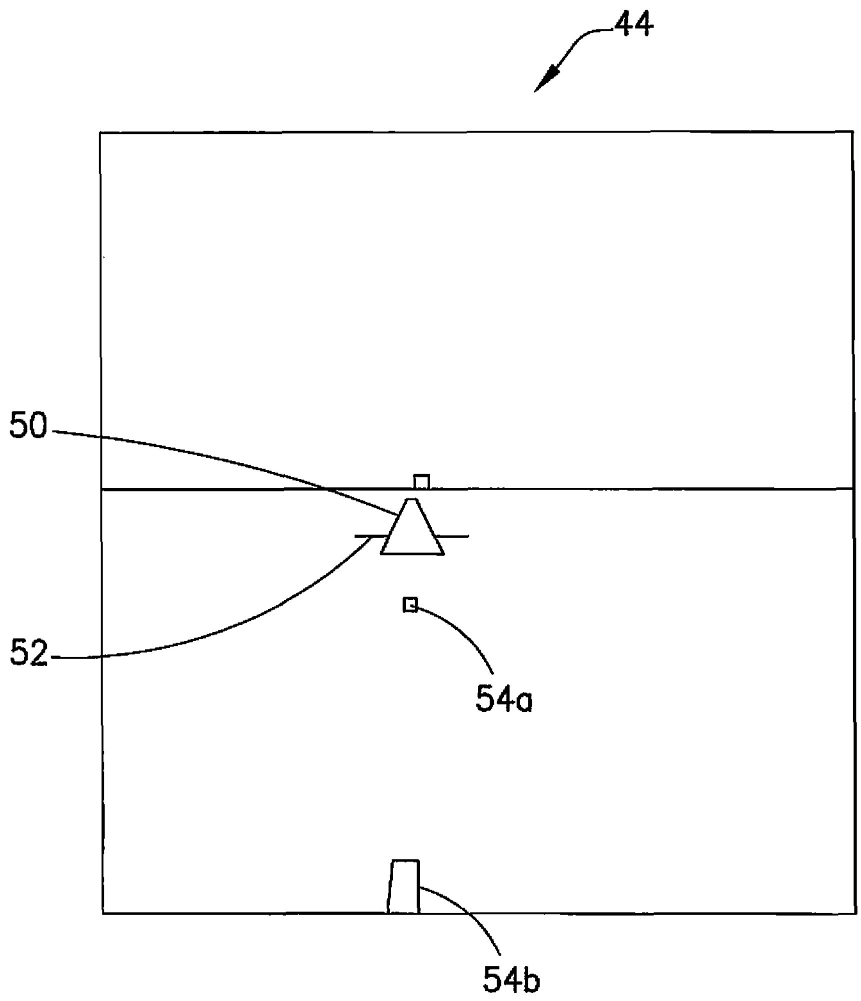
FIG. 5A is a diagram showing the synthetic runway presentation of FIG. 5 on a larger scale.

The symbology of synthetic runway presentation 44 in accordance with one embodiment is shown on an enlarged scale in FIG. 5A. The runway is represented by a trapezoidal runway symbol 50. The line segments 52 on opposite sides of the runway symbol 50 represent the position of the GPIP. Symbols 54*a* and 54*b* represent respective extended runway centerline segments. Symbols 50, 52, 54*a* and 54*b* move in unison when the position of the synthetic runway on the display screen is adjusted.

As part of the process depicted in the flowchart of FIG. 5, the computer system includes a software module 30, which computes the position of the airplane relative to the runway. In the selected reference frame, the GPS latitude and longitude information $\overline{X}_{GPS}$ and the barometric altitude information are used to determine the current aircraft location. (It should be appreciated that the airplane altitude used in the computations can be derived from GPS signals instead of being measured by a pressure altimeter.) The computer system also retrieves selected information from the airborne navigation database to determine (in the same reference frame) the location of the runway. The relative distances between the airplane and key reference points on the runway are computed in the selected coordinate frame.

Figure 6:
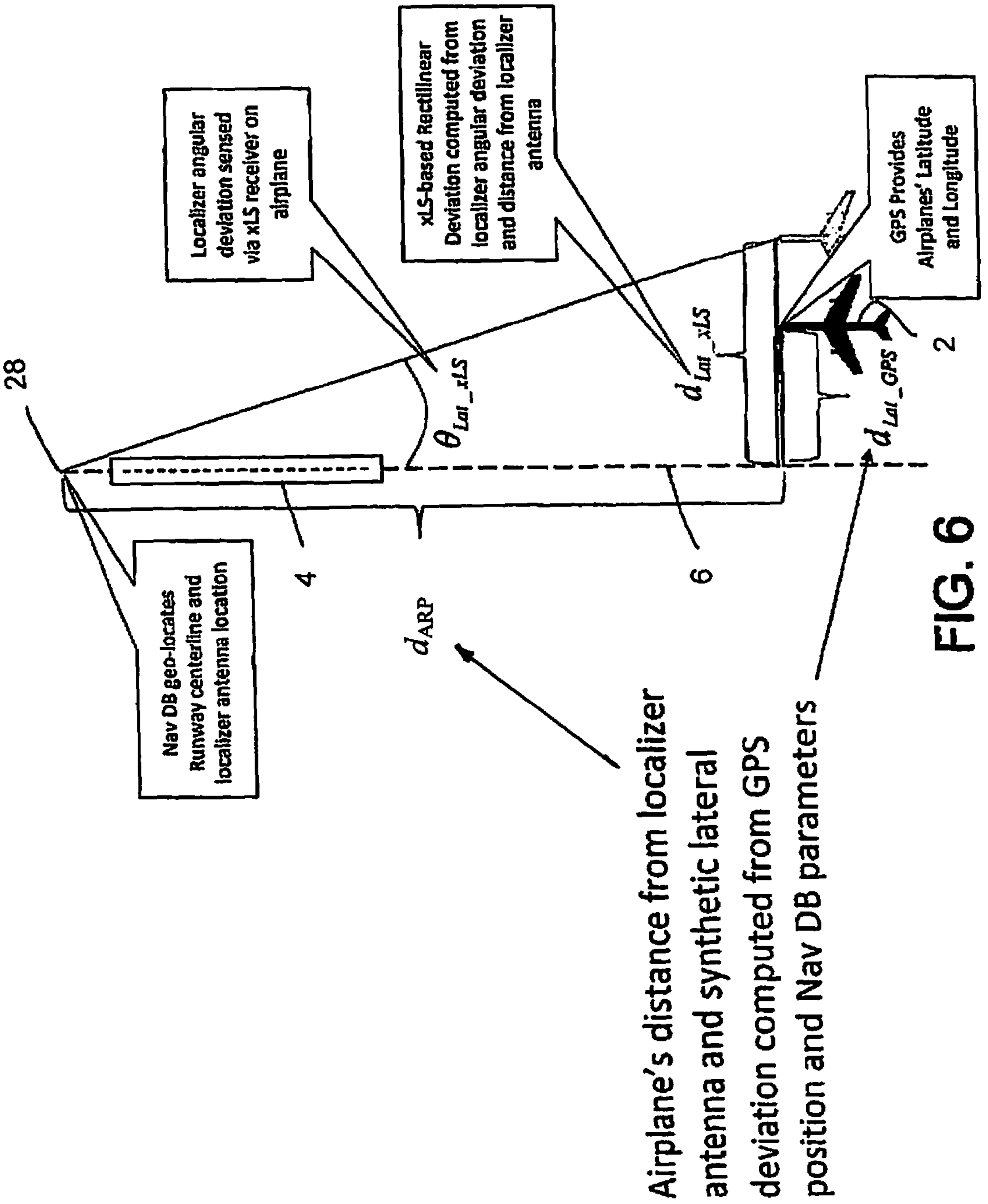
FIG. 6 is a diagram showing lateral position parameters for an airplane approaching a runway, which parameters are referred to in the description of the algorithm depicted in FIG. 5. The approach angle is exaggerated for illustration purposes.
Figure 7:
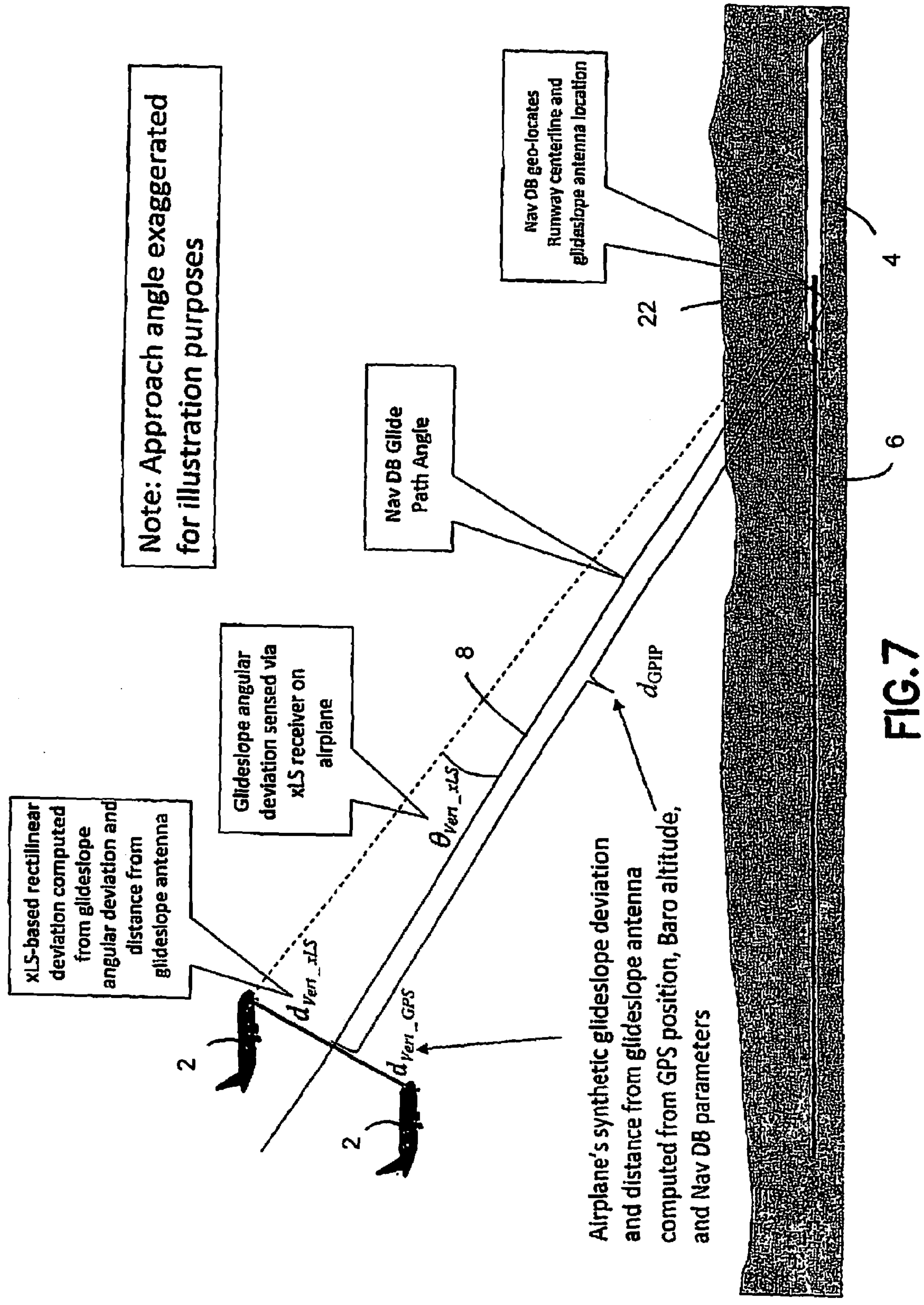
FIG. 7 is a diagram showing vertical position parameters for an airplane approaching a runway, which parameters are referred to in the description of the algorithm depicted in FIG. 5. The approach angle is exaggerated for illustration purposes.

For example, module 30 computes the distance $d_{ARP}$ shown in FIG. 6, which is the distance from the airplane 2 to the Azimuth Reference Point 28, and the distance $d_{GPIP}$ shown in FIG. 7, which is the distance from the airplane 2 to the Glide Path Intercept Point 22. As previously disclosed, the Azimuth Reference Point 28 corresponds to the point that serves as the reference for the localizer beam (i.e., the localizer transmitter location), 1000 ft beyond the far end of the runway. The exact position of the ARP is computed using the latitude/longitude of the end of the runway ($\overline{X}_{Stop\_End\_Runway}$), retrieved from the navigation database onboard the airplane. The GPIP corresponds to the point on the runway that serves as the reference for the glideslope beam (i.e. the glideslope antenna location), roughly 1000 ft from the runway threshold. The exact position of the GPIP is computed using the latitude/longitude of the runway threshold ($\overline{X}_{Runway\_Threshold}$) elevation of the runway threshold relative to mean sea level ($Z_{MSL\_Threshold}$) Glide Path Angle, and Threshold Crossing Height, all of which are retrieved from the navigation database onboard the airplane.

Module 30 outputs the distances $d_{ARP}$ and $d_{GPIP}$ to module 32, which comprises software for computing the xLS-based rectilinear (i.e., cross-track) deviations. Using ICAO Annex 10 standards governing ILS installations, runway length and glide path angle (from the airborne navigation database), the angular xLS (ILS or GLS) deviations (from the airborne navigation radio receiver), and the computed distances $d_{ARP}$ and $d_{GPIP}$, module 32 computes the lateral rectilinear deviation $d_{Lat\_xLS}$ and vertical rectilinear deviation $d_{Vert\_xLS}$, which respectively represent the distances between the airplane 2 and the xLS localizer and glideslope beam nulls.

Referring to FIG. 6, the distance $d_{ARP}$ and the synthetic lateral rectilinear deviation $d_{Lat\_GPS}$ are computed from the GPS position of the aircraft 2 and runway parameters retrieved from the navigation database. GPS provides the latitude and longitude of the airplane 2. The navigation database geo-locates the runway centerline 6 and the location of the Azimuth Reference Point 28, i.e., the localizer antenna. The lateral angular deviation $\theta_{Lat\_xLS}$ is sensed by means of an xLS receiver onboard airplane 2. The xLS-based lateral rectilinear deviation $d_{Lat\_xLS}$ is computed from the lateral angular deviation $\theta_{Lat\_xLS}$ and the distance $d_{ARP}$.

Referring to FIG. 7, the distance $d_{GPIP}$ and the synthetic vertical rectilinear deviation $d_{Vert\_GPS}$ are computed from the GPS position and barometric altitude of the aircraft 2 and runway parameters retrieved from the navigation database. As previously mentioned, GPS provides the latitude and longitude of the airplane 2. The navigation database geo-locates the runway centerline 6 and the location of the Glide Path Intersect Point 22, i.e., the glideslope antenna. The navigation database also provides the Glide Path Angle. The vertical angular deviation $\theta_{Vert\_xLS}$ is sensed by means of an xLS receiver onboard airplane 2. The xLS-based vertical rectilinear deviation $d_{Vert\_xLS}$ is computed from the vertical angular deviation $\theta_{Vert\_xLS}$ and the distance $d_{GPIP}$.

The point on the airplane to which the distances $d_{ARP}$ and $d_{GPIP}$ are measured is the Guidance Control Point (GCP), which corresponds to the location of the glideslope antenna on the airplane. Since the GCP is offset from GPS antenna location, there is also a lever arm correction in the distance calculations that takes into account the airplane's orientation relative to the runway.

Module 30 also outputs the distances $d_{ARP}$ and $d_{GPIP}$ to module 34, which comprises software for computing synthetic rectilinear deviations. Using the computed distances $d_{ARP}$ and $d_{GPIP}$, and the definition of the desired Final Approach Segment from the airborne navigation database (possibly based upon Glide Path Angle, Threshold Crossing Height, and the azimuth computed from the latitude and longitude of the runway end points), module 34 computes the GPS-based lateral rectilinear deviation $d_{Lat\_GPS}$ and GPS-based vertical rectilinear deviation $d_{Vert\_GPS}$ (respectively shown in FIGS. 6 and 7), which respectively represent the distances between the airplane 2 and the desired Final Approach Segment in the localizer and glideslope directions.

The outputs $d_{Lat\_GPS}$ and $d_{Vert\_GPS}$ from module 34 are respectively subtracted from the outputs $d_{Lat\_xLS}$ and $d_{Vert\_xLS}$ of module 32 in modules 36 and 38. Module 36 computes a lateral rectilinear deviation correction term $\delta_{Lat}$ which is the difference between the xLS-based and GPS-based lateral rectilinear deviations, i.e., $\delta_{Lat}=d_{Lat\_xLS}-d_{Lat\_GPS}$. Module 38 computes a vertical rectilinear deviation correction term $\delta_{Vert}$ which is the difference between the xLS-based and GPS-based vertical rectilinear deviations, i.e., $\delta_{Vert}=d_{Vert\_xLS}-d_{Vert\_GPS}$. The correction terms $\delta_{Lat}$ and $\theta_{Vert}$ are output to a filtering module 40.

The filtering module 40 filters the correction terms $\theta_{Lat}$ and $\theta_{Vert}$ in a manner that avoids perceptible motion of the synthetic runway on the pilot display which is not associated with airplane motion, and also prevents known anomalous behavior in the xLS guidance signals from corrupting the synthetic runway presentation. The filtered correction terms output by filtering module 40 are indicated in FIG. 5 by the designations $\delta_{Lat\_Filt}$ and $\delta_{Vert\_Filt}$. The filtering process is described in the following paragraph.

The steady-state differences between the airplane's GPS/baro-derived (or solely GPS-derived) relative position with respect to the localizer and glideslope beam nulls and the received xLS deviations for localizer and glideslope are expected to be in the form of a steady bias error in the horizontal GPS-derived position and an error in the vertical position that slowly changes with altitude changes due to barometric properties. When logic is satisfied to initiate the correction, which is based upon being sufficiently close to the runway and sufficiently close to the localizer and/or glideslope beams (each correction can be initiated individually), the correction term is initiated at zero, and then introduced via a rate-limited lag filter. The rate limiting is adjusted as a function of the airplane's actual closure rate on the localizer and/or glideslope beam. The correction term will manifest itself on the pilot display as motion in the displayed synthetic runway that is not associated with actual airplane motion. By restricting the rate at which the correction term is introduced as a function of actual airplane motion, the degree to which this correction is detectable by the pilot on the pilot display is mitigated. Once established on the localizer and/or glideslope null, the rate limit is set such that small corrections remain possible, but excessive disturbances in the xLS deviations are rejected appropriately. In the vertical axis specifically, as the main source of airplane position information is barometric in nature, the vertical correction is anticipated to continue updating slowly as the airplane descends and barometric conditions (based on temperature, pressure, etc.) change. The time constant governing the lag aspect of the filter is selected to reject known adverse properties of the xLS deviations, and in particular the ILS deviations. A common ILS deviation disturbance known as a "fly-through" occurs when another aircraft passes between the aircraft using the deviation guidance and the ILS transmitter. This is most common during visual conditions when a first aircraft is on final approach and a second aircraft is cleared for takeoff on the runway the first aircraft is approaching. The departing (second) aircraft passes between the localizer transmitter and the first aircraft which is on final approach. This generates high-frequency, short-duration, oscillatory behavior in the ILS localizer deviation. The lag filter is specifically tuned to ensure this type of disturbance in the ILS deviation is not allowed to corrupt the synthetic runway presentation. The rate limits and lag filter constants can be readily designed using a high-fidelity non-linear airplane simulation that includes models of the xLS navigation aids, airplane dynamics, GPS-based navigation, barometric properties of the atmosphere, and sets of data that characterize the expected adverse behavior of the guidance sources.

The filtered correction terms $\delta_{Lat\_Filt}$ and $\delta_{Vert\_Filt}$ are output to module 42, which comprises software for correcting the airplane position relative to the runway. Module 42 also receives the airplane position data and the distances $d_{ARP}$ and $d_{GPIP}$ from module 30. Module 42 applies the filtered correction terms $\theta_{Lat\_Filt}$ and $\theta_{Vert\_Filt}$ to the GPS/baro-based position vector. This is done by using the lateral correction term to scale a unit vector that is both horizontal and perpendicular to the approach path, as determined from the runway orientation. The vertical correction term is used to scale a unit vector that is perpendicular to both the approach path and the lateral unit vector. These lateral and vertical unit vectors that have been scaled by the magnitude of the correction terms are added to the GPS/baro-based position vector of the airplane. The resulting corrected position vector $\overline{R}_{correction}$ is output to the display unit 11.

Once the rectilinear magnitudes of the correction terms are determined in the runway reference frame, and then transformed into the appropriate reference frame that is used for the relative airplane to runway distance vector or "position vector", then one can add that same rectilinear correction to any relative distance vector, whether it be GCP to GPIP or GCP to ARP. The relative distance of importance depends upon how the drawing of the runway is mechanized. Given appropriate runway geometry (length, width, azimuth), one could easily locate the four corners of the runway with respect to any reference point (e.g., the GPIP, ARP, or LTP) for the purpose of rendering the synthetic runway on the display. In accordance with one embodiment, the part of the synthetic runway implementation that renders lines to the display establishes the runway geometry and airplane position relative to the LTP. However, in the alternative, the GPIP or ARP or center of the Earth could be used. The correction term would work equally well no matter what reference point is used, as long as both the correction term and the other vectors in question are in the same coordinate system.

The computer system further comprises a module 46 for computing a display accuracy metric. This display accuracy metric is equal to the magnitude of the apparent offset on the pilot display 11 between the indicated aim point target location (i.e., the GPIP) based upon the unfiltered correction terms $\delta_{Lat}$ and $\delta_{Vert}$, and the indicated aim point target location based upon the filtered correction terms $\delta_{Lat\_Filt}$ and $\delta_{Vert\_Filt}$. This is done by finding the respective differences between the unfiltered correction terms $\delta_{Lat}$ and $\delta_{Vert}$ and the filtered correction terms $\delta_{Lat\_Filt}$ and $\delta_{Vert\_Filt}$, and then dividing those differences by the GPS/baro-based computed distance $d_{GPIP}$ between the airplane and Glide Path Intercept Point, resulting in an estimation of the apparent angular offset. The value of the display accuracy metric is output to a module 48, which compares it to specified thresholds established to ensure consistency with the primary guidance cue.

If the display accuracy metric from module 46 indicates a sufficient disagreement between the unfiltered and filtered correction terms with sufficient persistence when the airplane is beyond a predetermined location on the approach, module 48 issues an alert and inhibits the synthetic runway presentation on the display unit 11. In response to the generation of an alert signal, an event flag can be set. The system depicted in FIG. 1 may further comprise a device that produces an audible or visible warning in response to generation of the alert signal. For example, a visible warning could be displayed on a cockpit display screen.

In response to receipt of the corrected position vector $\overline{R}_{Correction}$ from module 42 and in the absence of an alert/inhibit signal from module 48, the display unit 11 renders a synthetic runway using standard computer graphics techniques. The corrected position of the airplane relative to the runway threshold is used to compute the position of the runway symbology on the display unit 11.

While systems and methods for assuring the accuracy of a synthetic runway presentation have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having at least one processing unit (e.g., a central processing unit) and some form of memory (i.e., computer-readable medium) for storing a program which is readable by the processing unit(s).

The method claims set forth hereinafter should not be construed to require that the steps recited therein be performed in the order specified (any ordering in the claims is used solely for the purpose of referencing previously recited steps). Nor should they be construed to exclude respective portions of two or more steps being performed concurrently or alternatingly.

The invention claimed is:

1. A method for positioning a synthetic runway presentation on a display screen of a display unit as an airplane approaches a runway, comprising the following steps performed by an onboard computer system:

(a) computing first rectilinear deviation data representing successive estimated rectilinear deviations of the airplane from the desired flight path during the approach, the first rectilinear deviation data being computed based at least in part on airplane sensed angular deviation data from ground-based reference beams and airplane-to-runway distance data;

(b) computing second rectilinear deviation data representing successive estimated rectilinear deviations of the airplane from the desired flight path during the approach, the second rectilinear deviation data being computed based at least in part on airplane latitude, longitude and altitude data and runway data;

(c) computing a corrected position vector based at least in part on a difference between said first and second rectilinear deviation data; and (d) controlling a display unit to display a synthetic runway presentation having a position on the display screen that is a function of said corrected position vector.

2. The method as recited in claim 1, wherein step (c) comprises filtering differences between said first and second rectilinear deviation data to avoid perceptible motion of the synthetic runway presentation which is not associated with airplane motion.

3. The method as recited in claim 2, further comprising:

computing a display accuracy metric based on differences between unfiltered and filtered differences between said first and second rectilinear deviation data; and inhibiting display of said synthetic runway presentation if the display accuracy metric indicates a difference greater than a threshold with sufficient persistence when the airplane is beyond a predetermined location on the approach.

4. The method as recited in claim 3, wherein step (d) further comprises controlling the display unit to display a primary guidance cue based on signals from an autopilot, said threshold having a value that assures that an aim point of said synthetic runway presentation will appear within said primary guidance cue when the airplane is stabilized on the approach path.

5. The method as recited in claim 2, further comprising:

computing a display accuracy metric based on differences between unfiltered and filtered differences between said first and second rectilinear deviation data; and issuing an alert signal to the pilot if the display accuracy metric indicates a difference greater than a threshold with sufficient persistence when the airplane is beyond a predetermined location on the approach.

6. The method as recited in claim 1, wherein step (d) comprises moving said synthetic runway presentation from an uncorrected position on the display screen to said corrected position on the display screen.

7. A method for positioning a synthetic runway presentation on a display screen of a display unit as an airplane approaches a runway, comprising the following steps performed by an onboard computer system:

(a) obtaining runway and path definition data from an airborne database;

(b) acquiring sensed angular deviation data from ground-based reference beams and latitude, longitude and altitude data for the aircraft during its approach, said angular deviation data representing successive angular deviations of the airplane from a desired flight path;

(c) computing distance data representing successive distances of the airplane from the runway during the approach based on the latitude, longitude and altitude data and the runway data;

(d) computing first rectilinear deviation data representing successive estimated rectilinear deviations of the airplane from the desired flight path during the approach, the first rectilinear deviation data being computed based at least in part on the angular deviation data and the distance data;

(e) computing second rectilinear deviation data representing successive estimated rectilinear deviations of the airplane from the desired flight path during the approach, the second rectilinear deviation data being computed based at least in part on the latitude, longitude and altitude data representing a corrected position vector and the runway data;

(f) computing a corrected position vector based at least in part on a difference between said first and second rectilinear deviation data; and (g) controlling a display unit to display a synthetic runway presentation having a position on a display screen that is a function of said corrected position vector.

8. The method as recited in claim 7, wherein step (f) comprises filtering differences between said first and second rectilinear deviation data to avoid perceptible motion of the synthetic runway presentation which is not associated with airplane motion.

9. The method as recited in claim 8, further comprising:

computing a display accuracy metric based on differences between unfiltered and filtered differences between said first and second rectilinear deviation data; and inhibiting display of said synthetic runway presentation if the display accuracy metric indicates a difference greater than a threshold with sufficient persistence when the airplane is beyond a predetermined location on the approach.

10. The method as recited in claim 9, wherein step (g) further comprises controlling the display unit to display a primary guidance cue based on signals from an autopilot, said threshold having a value assuring that an aim point of said synthetic runway presentation will appear within said primary guidance cue when the airplane is stabilized on an approach path.

11. The method as recited in claim 8, further comprising:

computing a display accuracy metric based on differences between unfiltered and filtered differences between said first and second rectilinear deviation data; and issuing an alert signal to the pilot if the display accuracy metric indicates a difference greater than a threshold with sufficient persistence when the airplane is beyond a predetermined location on the approach.

12. The method as recited in claim 7, wherein step (g) comprises moving said synthetic runway presentation from an uncorrected position on the display screen to said corrected position on the display screen.

13. A device for displaying a synthetic runway as an airplane approaches a runway, comprising a display screen and a computer system programmed to perform the following operations:

(a) computing first rectilinear deviation data representing successive estimated rectilinear deviations of the airplane from the desired flight path during the approach, the first rectilinear deviation data being computed based at least in part on airplane sensed angular deviation data from ground-based reference beams and airplane-to-runway distance data;

(b) computing second rectilinear deviation data representing successive estimated rectilinear deviations of the airplane from the desired flight path during the approach, the second rectilinear deviation data being computed based at least in part on airplane latitude, longitude and altitude data and runway data;

(c) computing a corrected position vector based at least in part on a difference between said first and second rectilinear deviation data; and (d) controlling said display screen to display a synthetic runway presentation having a position that is a function of said corrected position vector.

14. The device as recited in claim 13, wherein step (c) comprises filtering differences between said first and second rectilinear deviation data to avoid perceptible motion of the synthetic runway presentation which is not associated with airplane motion.

15. The device as recited in claim 14, wherein said computer system is further programmed to perform the following operations:

computing a display accuracy metric based on differences between unfiltered and filtered differences between said first and second rectilinear deviation data; and inhibiting display of said synthetic runway presentation if the display accuracy metric indicates a difference greater than a threshold with sufficient persistence when the airplane is beyond a predetermined location on the approach.

16. The device as recited in claim 15, wherein step (d) further comprises controlling the display unit to display a primary guidance cue based on signals from an autopilot, said threshold having a value that assures that an aim point of said synthetic runway presentation will appear within said primary guidance cue when the airplane is stabilized on the approach path.

17. The device as recited in claim 13, wherein step (d) comprises moving said synthetic runway presentation from an uncorrected position on the display screen to said corrected position on the display screen.

18. An onboard system for positioning a synthetic runway presentation on a display screen of a display unit as an airplane approaches a runway, said onboard system comprising:

a display unit comprising a display screen;

a localizer receiver that provides lateral difference in depth of modulation data;

a GPS receiver for receiving GPS signals;

a database containing runway data for a runway and path definition data; and a computer system programmed to perform the following operations:

(a) determining a latitude and a longitude of the airplane from said GPS signals;

(b) determining an altitude of the airplane;

(c) computing a distance separating the airplane and a point on the runway based at least in part on at least said latitude, said longitude, said altitude, said runway data, and said path definition data;

(d) computing a lateral angular deviation of the airplane based at least in part on said lateral difference in depth of modulation data;

(e) computing a lateral rectilinear deviation of the airplane based at least in part on said distance and said lateral angular deviation;

(f) computing a synthetic lateral rectilinear deviation of the airplane based at least in part on said distance and said path definition data;

(g) computing a first difference between said lateral rectilinear deviation and said synthetic lateral rectilinear deviation;

(h) computing a corrected lateral position based at least in part on said first difference and a lateral position characterized by said latitude and said longitude of the airplane; and (i) controlling said display unit to display on said display screen a synthetic runway presentation having a lateral position that is a function of said corrected lateral position.

19. The system as recited in claim 18, further comprising a lag filter that filters said difference between said lateral rectilinear deviation and said synthetic lateral rectilinear deviation.

20. The system as recited in claim 18, further comprising a glideslope receiver that provides vertical difference in depth of modulation data, wherein said computer system is further programmed to perform the following operations:

(j) computing a vertical angular deviation of the airplane based at least in part on said vertical difference in depth of modulation data;

(k) computing a vertical rectilinear deviation of the airplane based at least in part on said distance and said vertical angular deviation;

(l) computing a synthetic vertical rectilinear deviation of the airplane based at least in part on said distance and said path definition data;

(m) computing a second difference between said vertical rectilinear deviation and said synthetic vertical rectilinear deviation; and (n) computing a corrected vertical position based at least in part on said second difference and a vertical position characterized by said latitude and said longitude of the airplane, wherein operation (i) further comprises controlling said display unit to display on said display screen a synthetic runway presentation having a vertical position that is a function of said corrected vertical position.

* * * * *